United States Patent
Julia et al.

(10) Patent No.: US 7,289,960 B2
(45) Date of Patent: Oct. 30, 2007

(54) SYSTEM AND METHOD FOR SPEECH ACTIVATED INTERNET BROWSING USING OPEN VOCABULARY ENHANCEMENT

(75) Inventors: Luc E. Julia, Oakland, CA (US); Jehan G. Bing, Menlo Park, CA (US); Jerome Dubreuil, San Francisco, CA (US)

(73) Assignee: AgileTV Corporation, Menlo Park, CA (US)

( * ) Notice: Subject to any disclaimer, the term of this patent is extended or adjusted under 35 U.S.C. 154(b) by 293 days.

(21) Appl. No.: 10/971,664

(22) Filed: Oct. 22, 2004

(65) Prior Publication Data

US 2005/0131675 A1 Jun. 16, 2005

Related U.S. Application Data

(62) Division of application No. 09/999,551, filed on Oct. 24, 2001, now Pat. No. 7,222,073.

(51) Int. Cl.
*G10L 15/00* (2006.01)
*G10L 15/18* (2006.01)

(52) U.S. Cl. .................. 704/270.1; 704/231; 704/251; 704/257; 704/9

(58) Field of Classification Search ............. None
See application file for complete search history.

(56) References Cited

U.S. PATENT DOCUMENTS

| | | | |
|---|---|---|---|
| 5,774,628 A * | 6/1998 | Hemphill | 704/255 |
| 5,819,220 A * | 10/1998 | Sarukkai et al. | 704/270.1 |
| 6,320,947 B1 | 11/2001 | Joyce et al. | |
| 6,374,177 B1 | 4/2002 | Lee et al. | |
| 6,381,316 B2 | 4/2002 | Joyce et al. | |
| 6,604,075 B1 * | 8/2003 | Brown et al. | 704/270.1 |
| 6,618,726 B1 * | 9/2003 | Colbath et al. | 707/6 |
| 6,658,414 B2 | 12/2003 | Bryan et al. | |
| 6,711,543 B2 | 3/2004 | Cameron | |

(Continued)

FOREIGN PATENT DOCUMENTS

EP 1341363 9/2003

(Continued)

OTHER PUBLICATIONS

Hemphill et al. "Surfing the Web by Voice" ACM Multimedia, Nov. 1995, San Francisco, CA. pp. 1-12.*

*Primary Examiner*—V. Paul Harper
(74) *Attorney, Agent, or Firm*—Michael A. Glenn; Glenn Patent Group (57) ABSTRACT

The invention discloses a system and method for speech-activated navigating or browsing via a speech control interface used in a speech-activated multifunctional communications system. In one embodiment, the invention provides an approach to extend speech-activated navigation by linking an output of an open vocabulary recognizer to an Internet search engine in order that a user may have more options to search information related to his spoken commands. In another embodiment, the invention provides a means to enable the user to orally navigate a database via a speech control interface wherein the selections and associated selection criteria are organized into a hierarchical view menu. In another embodiment, the invention provides an approach with high flexibility and accuracy to recognize the user's command using a new grammar structure and a matching score system.

2 Claims, 7 Drawing Sheets

U.S. PATENT DOCUMENTS

| | | |
|---|---|---|
| 6,714,632 B2 | 3/2004 | Joyce et al. |
| 6,721,633 B2 | 4/2004 | Funk et al. |
| 6,725,022 B1 | 4/2004 | Clayton et al. |
| 6,728,531 B1 | 4/2004 | Lee et al. |
| 6,799,201 B1 | 9/2004 | Lee et al. |
| 6,892,083 B2 | 5/2005 | Shostak |
| 7,050,977 B1 * | 5/2006 | Bennett ............ 704/270.1 |
| 7,113,981 B2 | 9/2006 | Slate |
| 2001/0019604 A1 | 9/2001 | Joyce et al. |
| 2002/0015480 A1 | 2/2002 | Daswani et al. |
| 2002/0049535 A1 | 4/2002 | Rigo et al. |
| 2002/0106065 A1 | 8/2002 | Joyce et al. |
| 2002/0146015 A1 | 10/2002 | Bryan et al. |
| 2003/0028380 A1 | 2/2003 | Freeland et al. |
| 2003/0033152 A1 | 2/2003 | Cameron |
| 2003/0065427 A1 | 4/2003 | Funk et al. |
| 2003/0068154 A1 | 4/2003 | Zylka |
| 2003/0073434 A1 | 4/2003 | Shostak |
| 2004/0077334 A1 | 4/2004 | Joyce et al. |
| 2004/0110472 A1 | 6/2004 | Witkowski et al. |
| 2004/0127241 A1 | 7/2004 | Shostak |
| 2004/0132433 A1 | 7/2004 | Stern et al. |
| 2005/0143139 A1 | 6/2005 | Park et al. |
| 2005/0144251 A1 | 6/2005 | Slate |
| 2005/0170863 A1 | 8/2005 | Shostak |
| 2006/0018440 A1 | 1/2006 | Watkins et al. |
| 2006/0050686 A1 | 3/2006 | Velez-Rivera et al. |
| 2006/0085521 A1 | 4/2006 | Sztybel |
| 2006/0206339 A1 | 9/2006 | Silvera et al. |
| 2006/0206340 A1 | 9/2006 | Silvera et al. |

FOREIGN PATENT DOCUMENTS

| | | |
|---|---|---|
| EP | 1003018 | 5/2005 |
| EP | 1633150 | 3/2006 |
| EP | 1633151 | 3/2006 |
| EP | 1742437 | 1/2007 |
| WO | 00/016568 | 3/2000 |
| WO | 00/021232 | 4/2000 |
| WO | 01/022112 | 3/2001 |
| WO | 01/022249 | 3/2001 |
| WO | 01/022633 | 3/2001 |
| WO | 01/022712 | 3/2001 |
| WO | 01/022713 | 3/2001 |
| WO | 01/039178 | 5/2001 |
| WO | 01/057851 | 8/2001 |
| WO | 02/007050 | 1/2002 |
| WO | 02/011120 | 2/2002 |
| WO | 02/017090 | 2/2002 |
| WO | 02/097590 | 12/2002 |
| WO | 04/021149 | 3/2004 |
| WO | 04/077721 | 9/2004 |
| WO | 05/079254 | 9/2005 |
| WO | 06/029269 | 3/2006 |
| WO | 06/033841 | 3/2006 |
| WO | 06/098789 | 9/2006 |

* cited by examiner

SYSTEM AND METHOD FOR SPEECH ACTIVATED INTERNET BROWSING USING OPEN VOCABULARY ENHANCEMENT

CROSS-REFERENCE TO RELATED APPLICATIONS

This application is a divisional of U.S. Ser. No. 09/999,551, filed Oct. 24, 2001 now U.S. Pat. No. 7,222,073, all of which is incorporated herein in their entirety by this reference thereto.

FIELD OF INVENTION

This invention relates generally to speech recognition technology, and more specifically to a system and method for speech-activated navigation.

BACKGROUND OF THE INVENTION

Speech recognition system has been in development for more than 25 years resulting in a variety of hardware and software tools for personal computers. Products and services employing speech recognition are developing rapidly and are continuously applied to new markets.

With the sophistication of speech recognition technologies, networking technologies, and telecommunication technologies, a multifunctional speech-activated communications system, which incorporates TV program service, video on demand (VOD) service, and Internet service and the like, becomes possible.

This trend of integration, however, creates new technical challenges, particularly in the field of navigating or browsing via a speech control interface.

For example, when the system is in the Internet browsing mode, the user could feel disappointed if the system is not responsive to a spoken command which is not very well matched with a button label displayed on a Web page. Therefore, a mechanism for extending speech-activated navigation to another available search engine in certain circumstances is desired.

Another example of technical challenge is that, when the system is in a video on demand (VOD) mode, traditional method of navigating hierarchical menus will no longer meet the efficiency needs. Hierarchical menus are widely used in automated systems that permit users to pick a desired item from a large list. The list for instance could be a list of items for sale, a list of films that may be vended by a video on demand (VOD) system, or some other kind of list.

The use of a hierarchy allows a user to reach a final selection by making a small number of choices among alternatives, perhaps a sequence of three to five such choices, where each intermediate choice narrows the range of list items from which the final selection will be made. For instance, in a video on demand (VOD) system, the range of selections in principle consists of every movie ever filmed, which of course may be a very long list. But if the selection process advances by indicating first a genre, then an actor, and so on, the long list may be navigated quickly. For this reason, hierarchical menus are quite common in graphical user interfaces, touchtone-based interactive telephone systems, and other modes of list selection.

A key drawback of hierarchical menu systems, however, is that they can be tedious and cumbersome to use. In particular, the choices must be made in the order dictated by the designer of the hierarchical system.

What is further desired is a means for alleviating the tedium, through the automatic creation of an automatic speech recognition system and associated grammar(s) and database(s), embodying the same list of selections and selection criteria present in a given hierarchical menu system, but conducted through the medium of the spoken word, and moreover, using modes of statement that are natural and fluent, rather than simply mirroring in words the selections that might be made either with a cursor and graphical display in the case of a graphical user interface, or a telephone keypad in the case of an interactive telephone system.

Another example of technical challenge is that when the system is in a video on demand (VOD) mode, if the user did not speak exactly the button label displayed by the speech control interface or if the input utterance is lower than a pre-set confidence level, the system may fail to recognize the correct command and thus the system would be unable to provide the service that the user requested. For example, in a one-grammar-path-per-title approach, if the user spoke "American President" instead of "The American President", the user's command would not be mapped to the correct movie "The American President".

Therefore, a system that can more generously recognize the user's input utterance without sacrificing reliability is further desired.

SUMMARY OF THE INVENTION

In one embodiment, the invention provides an approach to extend speech-activated navigation to Internet search. The system enables speech access to the Internet by mixing fixed grammars with open vocabulary for an open query to a search engine. If the spoken request doesn't match the vocabulary defined for the Internet browser to proceed, the entire spoken request is passed to a search engine that processes it and displays the results of the search. Then, the user may navigate the open Web with a speech-activated browser.

In another embodiment, the invention provides a means for alleviating the tedium of hierarchical menu browsing, through the automatic creation of an automatic speech recognition system and associated grammar(s) and database(s), embodying the same list of selections and selection criteria present in a given hierarchical menu system, but conducted through the medium of the spoken word, and moreover using modes of expression that are natural and fluent, rather than simply mirroring in words the selections that might be made either with a cursor and graphical display (in the case of a graphical user interface), or a telephone keypad (in the case of an interactive telephone system).

In another embodiment, the invention provides a mechanism to recognize the user's input utterance using a new grammar structure and a matching score system. In case that the user exactly spoke a movie title, a grammar structure based on each single movie title is generated and the command associated with the recognized movie title is linked and the video server delivers the movie to the user. In case that the user's input utterance does not match any movie title, generated is a grammar structure based on each single word of a list of candidate movie titles that may be selected—they may be the entire movie titles available in the database or a partial list determined according to a certain criterion. The speech recognizer first recognizes the keywords from the input utterance; then it applies the recognized keywords, via the grammar structure, to the candidate movie titles; and then, a processor computes the matching score of each movie title in the list. Finally, the processor decides the movie with highest matching score as one that the user desired and maps or links this movie title to a command acceptable by the video server, which in turn delivers the movie to the user. The matching score may be computed based on various standards, including but not limited to, the number of recognized words that appear in each movie title.

DETAILED DESCRIPTION OF THE INVENTION

A. Speech-Activated Communications System

Figure 1:
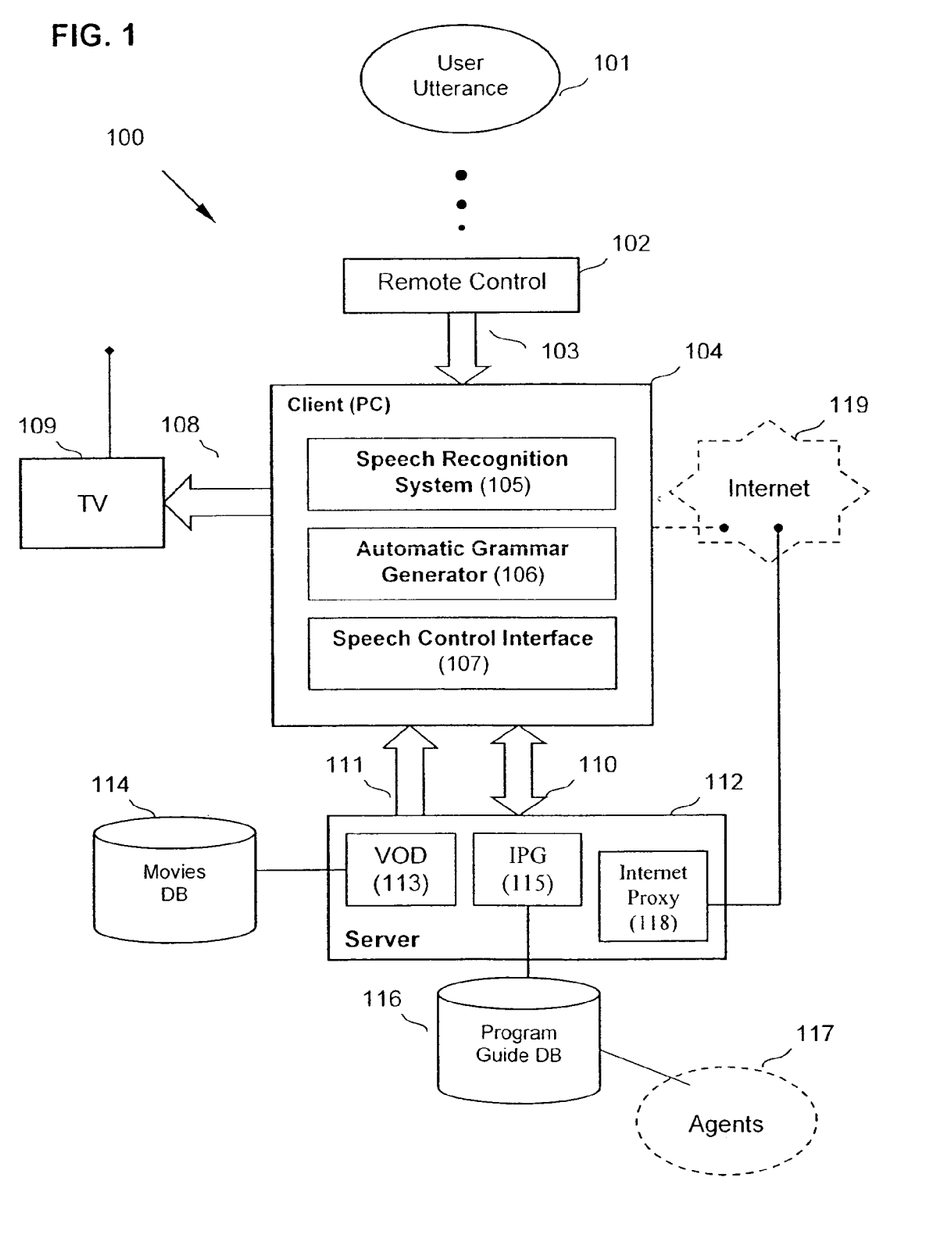
FIG. 1 is a block diagram of a speech-activated multi-functional communications system 100.

FIG. 1 is a block diagram illustrating a speech-activated communications system 100, which provides interactive program guide (IPG) service, video on demand (VOD) service, and World-wide Web browsing (Internet) service. The system incorporates a "real world" type experience, allowing the end user to complete the process of finding, selecting, and purchasing program and movie content. For example, upon confirmation of the purchase of a movie or selection of a television program, the selected movie, program, or channel is immediately displayed on the television screen.

The communications system 100 includes a speech-activated remote control 102, a personal computer (client) 104, a remote server 112, and a television set 109. The user 101 gives spoken commands using the remote control 102 that converts acoustic signals into electromagnetic signals or other kind signals receivable by a wireless receiver. The signals are interfaced to the personal computer 104 via a serial port and a communication protocol 103. The speech recognition system 105 running in the personal computer 104 converts the received signals into digital signals that can be executed by the personal computer. The automatic grammar generator 106 is an application for generating different grammar structures for different services. Using the remote control 102, the user 101 may browse for service via a speech control interface 107. The speech control interface may be in different modes depending on the service requested. For example, it is in VOD mode for video on demand (VOD) service. When an input utterance is processed, a specific grammar is applied to the speech recognition system 105. The computer processes the output of the speech recognition system 105 and executes the commands associated by the output. The service that the user requested is then delivered by the server 112 via NTSC 111 or Ethernet 110 and rendered on TV screen 109 via NTSC 108. The server 112 also provides Internet Proxy service 118 so that the user may browse the Internet via the speech control interface 107.

The server 112 is coupled to one or more content databases (114 and 116) that store content items such as movies, television programs, television channels, and etc. Typically, the databases are encoded for a database manager supporting the SQL format and include a movie list, television program list, actor list, and genre format. The content from the server 112 is visible as a window within the static interface or in full-screen mode, as the speech control interface demands.

B. Open Vocabulary Enhancement of Speech Activated Internet Browsing System

One embodiment of this invention is a system for enhancing or extending a speech-controlled Web browsing within the framework of the communications system 100 described above. In order to understand the invention, it is necessary to review the design of Web pages and speech-controlled Web browsers in general. We begin with the review, and then explain the nature of the invention.

A Web browser is a program running on a computer, typically called the client. This program receives textual descriptions of displays, also known as Web pages, to create on the client computer screen from another computer, typically called the server. The textual descriptions are written in a specific computer language, called HTML. The action of the Web browser is to interpret the HTML, and thereby render onto the client computer screen the combination of graphics and text specified in any selected Web page.

Typically there are regions of the rendered screen, labeled with text, that cause the client computer to take some action when the user moves his mouse over the affected region and clicks a mouse switch. These regions are themselves called "buttons."

The standard technique for speech-enabling a Web browser is to scan the HTML description of a page, and identify the text that is associated with each button, the text hereafter called a "button label." The button labels are then assembled into a grammar, where each arc or pathway through the grammar corresponds to a single complete button label. For a speech-enabled Web browser, the grammar and the speech recognition system are so arranged that when a user speaks the text that is associated with a given button label, the speech recognition system causes the client computer to take the same action that it would have taken had the user activated the same region of the screen by use of the mouse. Note that by nature of the construction of the grammar, the vocabulary that can be recognized for the page consists exclusively of the words that appear within button labels.

The problem with this approach is that the system is limited to all and only the text supplied with the HTML page. This makes it impossible to direct the browser to fetch and load an arbitrary Web page.

The approach according to this invention is an augmentation of the above scheme for speech-enabled Web browsing. As described above, the speech-enabled browser attempts to recognize an input utterance using the grammar constructed from button labels. However, if no one arc through the grammar is a satisfactory match for the utterance, the system will abandon this approach. Instead, the utterance will be reprocessed by an open vocabulary recognizer which may be a sub-system of the speech recognition system. Such an open vocabulary recognizer is not constrained by a grammar, but is designed to recognize arbitrary utterances constructed from a very large vocabulary, typically 50,000 words or more. The output of the recognition process will then be provided as a query to a search engine, which will seek and display Web link options that are a close match to the given query.

Figure 2A:
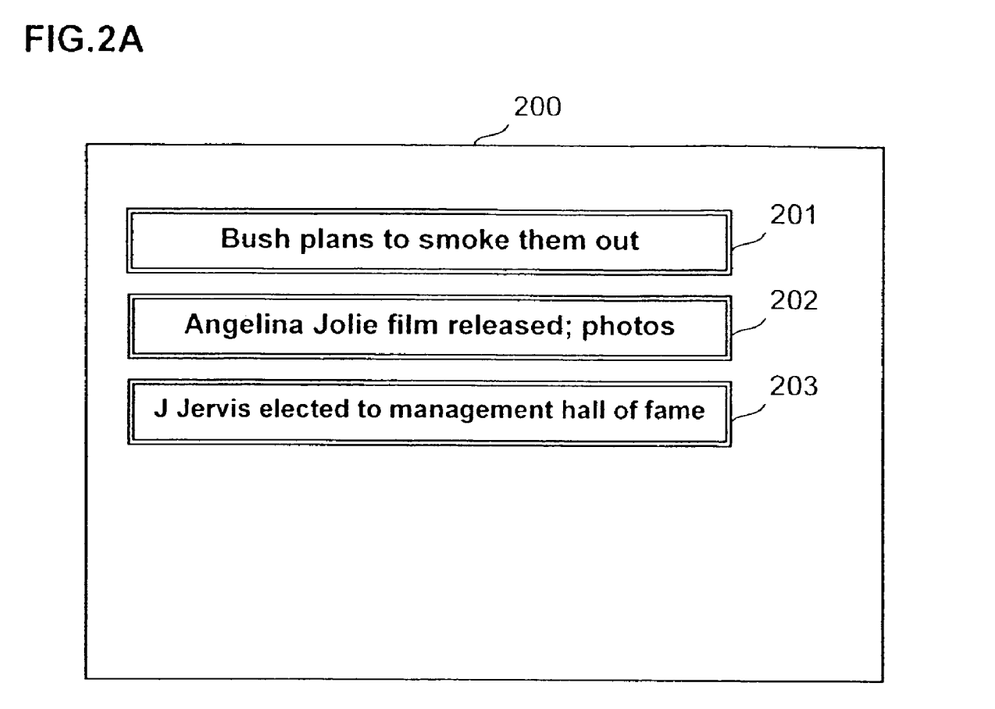
FIG. 2A is an exemplary word page 200 that appears on the screen as a collection of buttons with text on them.

We proceed to give greater detail on the architecture of this system. FIG. 2A shows an exemplary word Web page 200 that appears on the screen as a collection of buttons with text on them. The first button 201 corresponds to a news story that says: "Bush plans to smoke them out." The second button 202 says: "Angelina Jolie film released; photos." The third button 203 says: "J Jervis elected to management hall of fame." The text in the buttons is available to us in the form of HTML. The system takes the HTML and analyzes it, and then processes it into a grammar, which in this example, has three phrases associated with it: the first is the Bush phrase; the second is the Angelina Jolie phrase; and the third one is the Jim Jervis phrase.

Figure 2B:
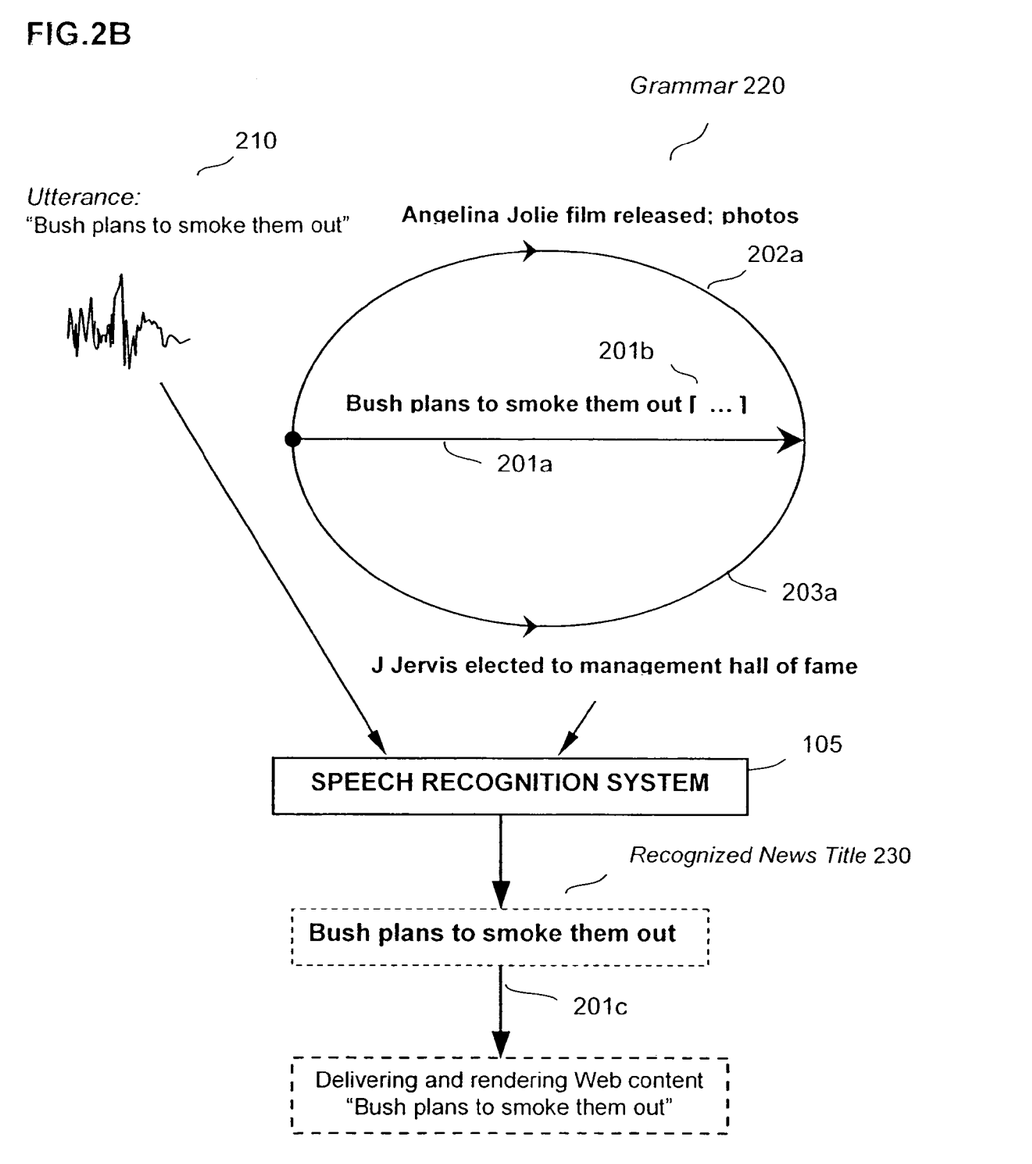
FIG. 2B is a diagram illustrating a grammar structure 220 and a query process wherein an input utterance 210 matches a grammar path 201a representing the textual content of a button 201 shown in FIG. 2A.

This grammar is then supplied to the speech recognition system 105, which proceeds to use the grammar to recognize the utterances given as input. FIG. 2B illustrates the case in which the user speaks, for example, the first statement corresponding to the first button 201. The grammar 220 has three grammar paths, 201a, 202a, and 203a, with reference to three button labels shown in FIG. 1A. The input of the process is the user's utterance ("Bush plans to smoke them out") 210, which is recognized by the speech recognition system 105 as a corresponding to the text "Bush plans to smoke them out" 230. Associated with the statement 201a, we have an action, which is also embedded in the grammar 220—not necessarily with square bracket 201b. Here the bracket 201b represents the fact that some additional information is being associated with the statement 201a. This may be a little piece of program implementing a command to activate a link 201c that lies underneath the button label 201.

Figure 2C:
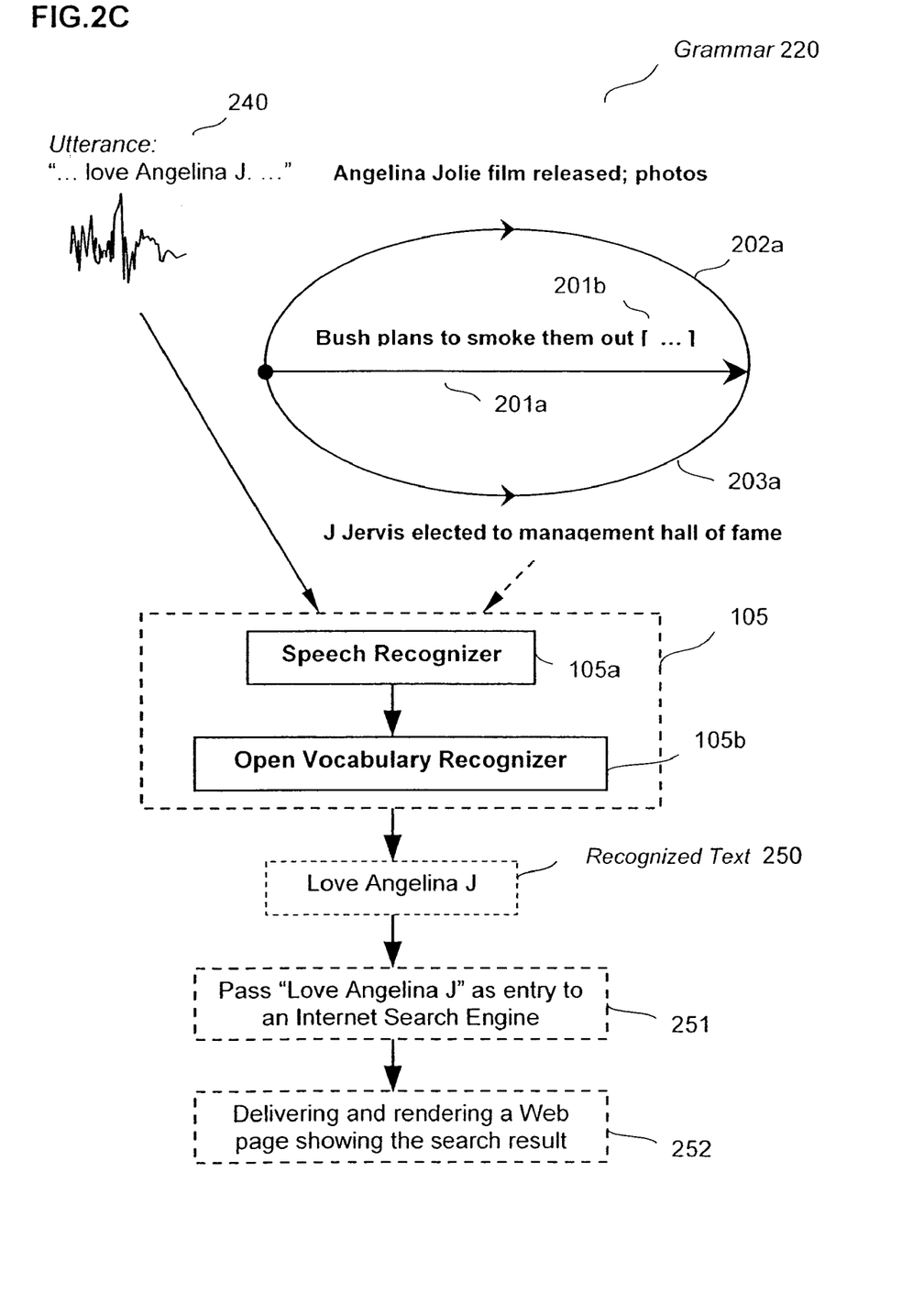
FIG. 2C is a diagram illustrating a grammar structure 220 and a query process wherein an input utterance 240 does not match any grammar path and the recognized text 250 for the input utterance 240 is passed to an Internet search engine 251.

In the case when an utterance matches closely to an arc of the grammar, the speech recognition system 105 will simply invoke the associated action such as 201c. However, if no arc of the grammar matches well, the system will reprocess the input utterance using an open vocabulary recognizer, and pass the resulting text to a standard Web search engine. FIG. 2C illustrates an example of this process, wherein the user's utterance 240 fails to match with any path of the grammar 220. The system processes the utterance 240 using an open vocabulary recognizer 105b and passes the output 250 (i.e. the recognized text) to an Internet search engine 251. As a result of the search, a Web page is delivered and rendered 251.

The follow steps further explains how this process works:

Taking a Web page as shown in FIG. 2A;

Scraping the Web page for its textual content;

Generating a grammar 220 as shown in FIG. 2B for the textual content, and applying this grammar to the speech recognition system 105;

Inputting an audio signal representing the user's utterance;

Determining the confidence level of the recognized statement representing the audio signal against a pre-set confidence level;

If the confidence level is high enough, i.e. the input utterance matches one of the grammar paths, then as FIG. 2B illustrated, executing the command associated with the recognized button label;

If the confidence level is not high enough, i.e., it fails to match any of the grammar paths (201a, 202a, 203a) in the grammar 220, then as FIG. 2C illustrated, passing the utterance through an open vocabulary recognizer 105b, which is designed to transcribe arbitrary statements or texts that do not match any particular grammar;

Taking the output 250 from that open vocabulary recognizer 105b as the input to an arbitrary Internet search engine such as Alta Vista or Yahoo Search. As a result, it comes back with a number of hits of Internet link options.

In summary, if the system cannot reconcile the text on a screen button with the spoken command (i.e. the input utterance), then it just defaults the command and leads to a broad Internet search.

C. Automatic Grammar Generation from Hierarchical Menus

Another embodiment of the invention is an architecture for automatic grammar generation from hierarchical menus. The architecture consists two key elements. The first one is a database, which lists the items from which a final selection is to be made. Each item in the original list is an entry in the database. Moreover, each entry is labeled with the selection criteria that it satisfies, as expressed in the original hierarchical menu system. Consider for example a long list of titles, comprising both television shows to be aired over a given period of time, and films available from a video on demand (VOD) system. Those database entries corresponding to the first category would bear some indication that they are television shows; those entries corresponding to movies would likewise bear some indication they are movies. Note that some titles would bear both indications. Continuing with this idea, a given title might also bear some indication of which actors appear in the show or movie, who directed the work, when it was produced, and so on. Any criterion embedded in the original hierarchical menu would be mirrored by indications made in the automatically generated database.

The second key element is the means to generate one or more grammars, reflecting the different selection criteria that may be applied against the database entries. (For information on the structure and meaning of a grammar in this context, consult the document "OSR 1.0 Developer's Guide," published by Speechworks International, 2001.) Continuing with the example, if the actors appearing in a television show or movie may be used as a selection criterion, then a grammar consisting of all actor names appearing in any database entry is generated. As we explain further below, the eventual idea is that if a given actor's name is spoken, only films or shows in which that actor appears will be extracted from the database.

The grammars for each different selection criterion are embedded within a larger grammar or set of grammars, which is constructed in such a manner that either a sequence of spoken commands (for instance, the uttering of the criterion name "actors," followed by the actress name "Angelina Jolie"), or a fluent statement such as "show me films starring Angelina Jolie" will obtain the database entries with the desired property, in a manner identical to selection by the same criteria within the original hierarchical menu system. The result of this action can then be further refined by continuing the process in the same way, but with additional selection criteria applied, to further narrow the entries obtained from the database. For example, if the system is not sure about the exact name of the actor or actress called, it presents to the user an intermediary screen with a list of actor candidates, and the user can make further selection from the list.

D. Use of Inexact and Partial Match to Improve Accuracy of Speech Recognition

Figure 3A:
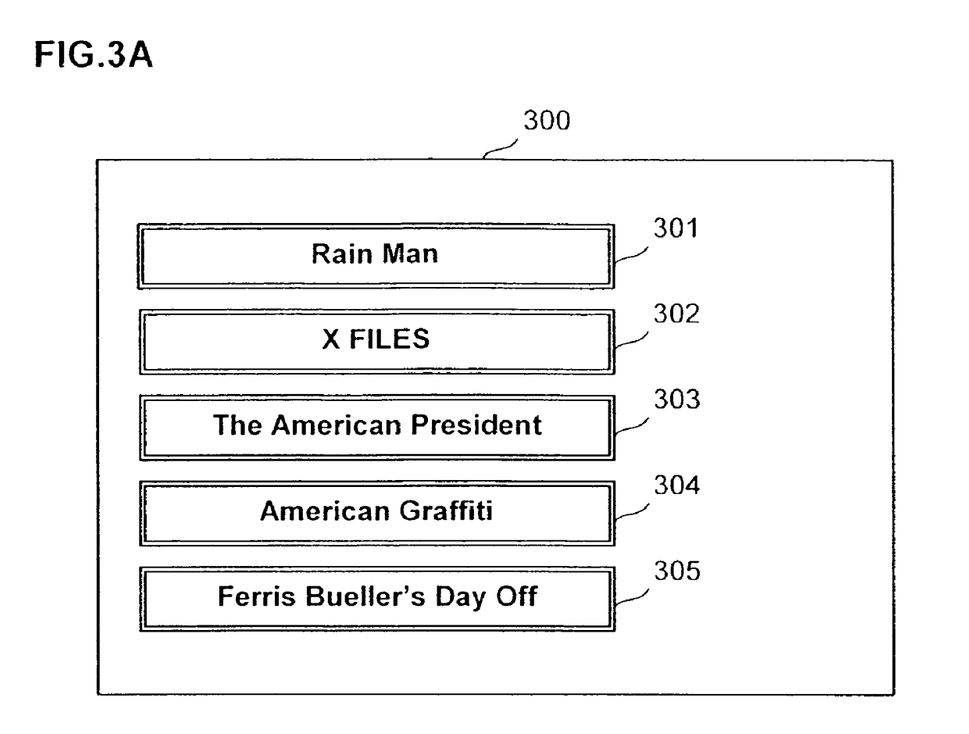
FIG. 3A is an exemplary page 300 of a speech control interface 107 for a speech-activated video on demand (VOD) system.

FIG. 3A illustrates an exemplary page 300 of a speech control interface for a speech-activated video on demand (VOD) system. A user may navigate through a large list of films by titles by operating various buttons on a remote control or by giving spoken commands via a microphone incorporated in the remote control. In the exemplary page 300, each movie title is presented in a button. For example, button 301 is for "Rain Main", button 302 for "X Files", button 303 for "The American President", button 304 for "American Graffiti", and button 305 for "Ferris Bueller's Day Off", etc.

Figure 3B:
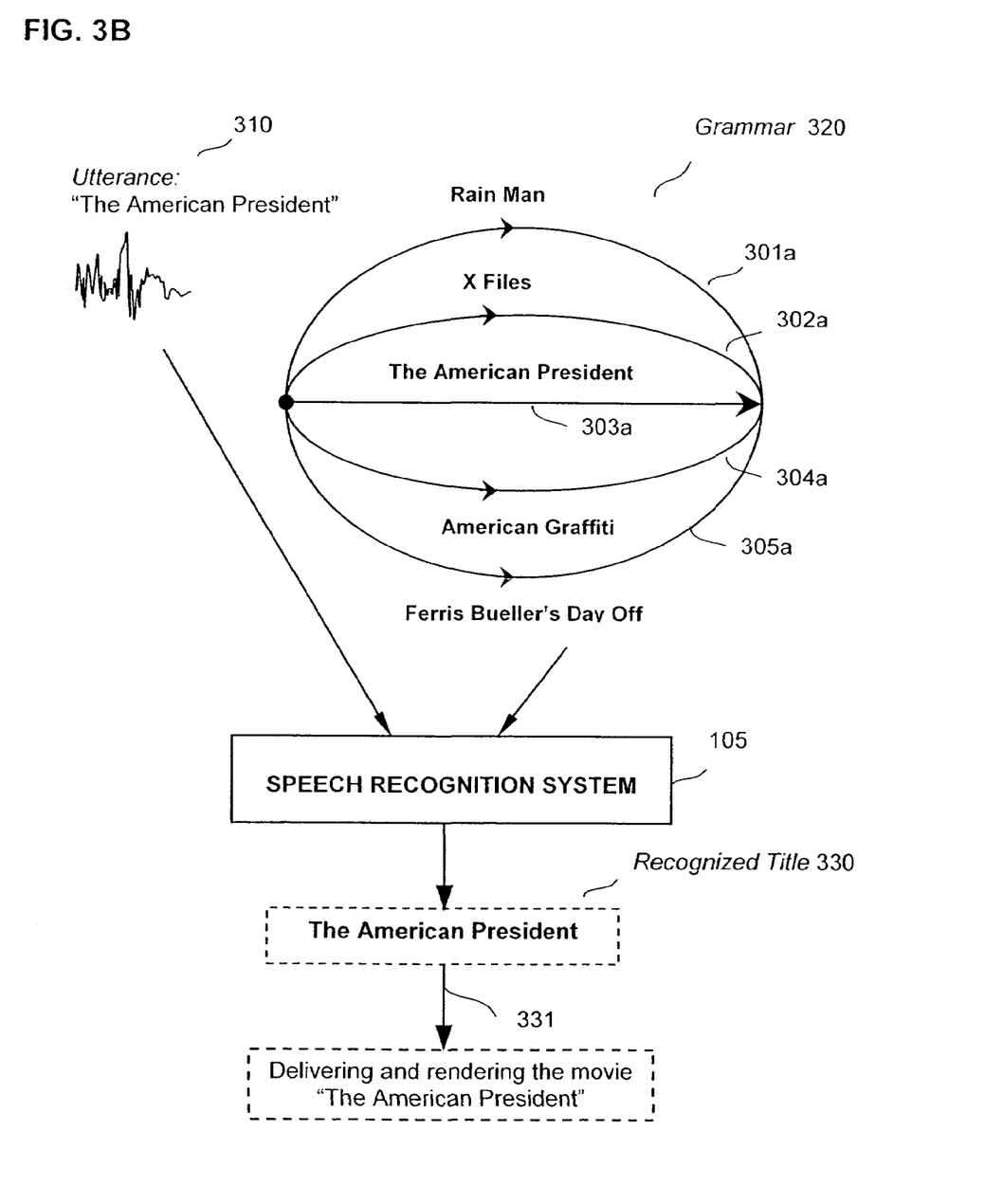
FIG. 3B is a diagram illustrating a grammar structure 320 and a query process wherein an input utterance 310 matches a grammar path 303a representing the movie title 303 shown in FIG. 3A.

Normally when we deal with this list of titles, the list is represented by a grammar in which each complete title corresponds to one arc or choice within the grammar. FIG. 3B illustrates such a grammar structure 320 wherein each arc represents a path for a movie title in the list shown in the Web page 300. For example, arc 301a is for "Rain Main", arc 302a for "X Files", arc 303a for "The American President", arc 304a for "American Graffiti", and arc 305a for "Ferris Bueller's Day Off", etc.

The input to the speech recognition system 105 is the user's utterance 310. The system processes the utterance 310 against the grammar 320. The path through the grammar that matches the utterance most closely in the acoustic sense is the output of the speech recognition system. For example, when the user spoke "The American President", the title "The American President" 303 was recognized and the speech recognition result 330 was mapped into a command 331 acceptable by a video server (See FIG. 1, 113 and 114).

In reality, users may garble and drop off words, for instance, saying "American President" rather than "The American President." For that reason, the word "the" was missing here. That would cause the path 303a to get a poor acoustic match score against the given utterance. The title "American Graffiti" 304 is not what the user said, but matches fairly well because the spoken word "American" matches "American", and "Graffiti" in 304 is about the same length as "President" in 203. It could end up getting a higher score than the desired film, just because the user neglected to utter the initial definite article "the" in the full title, "The American President."

Figure 3C:
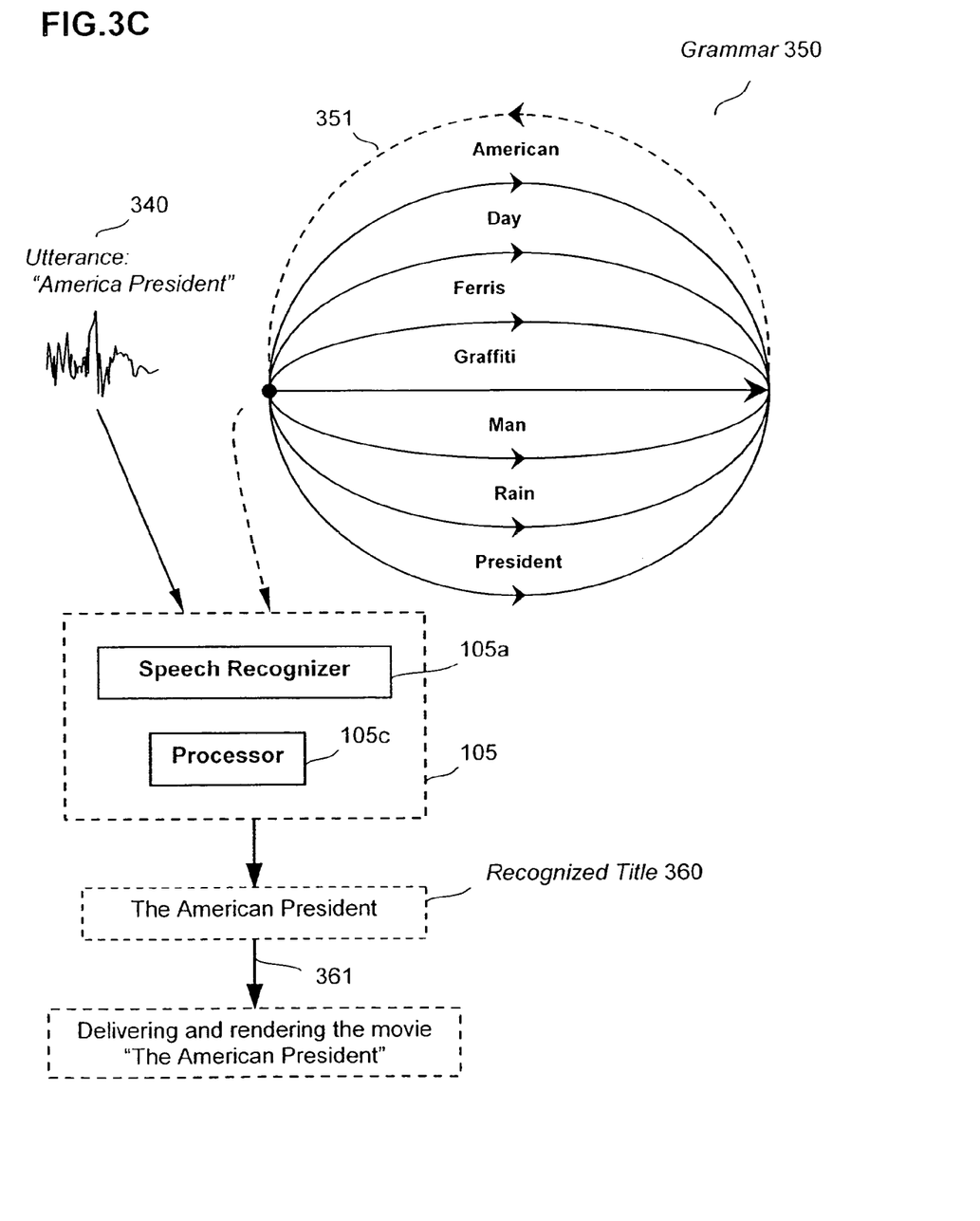
FIG. 3C is a diagram illustrating a grammar structure 350 and a query process wherein every single word included in a list movie titles is assigned to a distinct grammar path and an input utterance 340 not exactly matching to a movie title is recognized based on a word matching score system.

To solve this problem, we create a different grammar structure. Instead of keeping each movie title in one single path, we take all available movie titles from the database and cut each movie title into individual words such as "rain", "man", "the", "X", "files", "American", "graffiti", "president", and so on. Every single word included in any movie title is incorporated into the grammar structure as shown in FIG. 3C wherein each single word represents a single path. Moreover the grammar 350 is structured in such a way that each such word may be spoken any number of times.

In this case, when the utterance "American President" 340 is presented to the speech recognition system 105, the word "American" is recognized, followed by the word "President". Note that no association with the specific movie title "The American President" is yet made. The resulting sequence of words is called the keyword sequence S.

In the broadest conception of the invention, the keyword sequence S is then matched against a set of candidate titles C. Each element $C_i$ of C is then matched against S, by a function hereafter called ComputeScore(S, $C_i$). The elements of C are then sorted in decreasing order of quality of match. The resulting list may then be used in one of a number of ways, for example:

- The single top-scoring $C_i$ may be presented as the recognizer output, or
- Some predetermined number k of elements of C, consisting of the top-scoring k candidates, may be presented to the user, for final selection, or
- All elements whose score lies within some range or fraction of the top-scoring $C_i$ may be presented to the user, for final selection.

The ComputeScore(S, $C_i$) function may take any one of a number of forms. We list some of the possibilities, with the understanding that this is not to limit the scope of claim of the invention:

- A simple definition, illustrated in FIG. 2D, is to count the number of words of S that appear in each given $C_i$;
- A more sophisticated definition takes into account the relative order of words in S and $C_i$, computing a higher score when the words of S and Ci are in the same order and position;
- This score or some variant of it may be normalized by the number of words of the given $C_i$, so that long titles are not anomalously favored;
- This score or some variant of it may be normalized by the fraction of words in S that could match any word in $C_i$, so that a candidate that matches a few words of S well is not anomalously favored over another candidate $C_j$ that matches more words, but with an error in position; and
- The definition may take the recognition system's confidence of each word of S into account, in counting matches.

In addition, in one variant of the invention, the candidate list C is generated dynamically from a database, where certain criteria, if activated under user control, prevent adding a given title to the candidate list.

In another variant of the invention, in the process of dynamically generating the candidate list C, the words in the list are optionally processed into a form that matches the form of words used in the grammar. By this is meant, for instance, spelling out numbers as text.

In summary, the process described above includes the following steps:

- Creating a grammar structure 350 wherein every single word of each movie title that may be recognized is assigned to a distinct path in the grammar, and moreover so that any such word may be uttered any number of times and intermixed in order with any other word of the grammar;
- Recognizing an utterance 340 by a speech recognizer 105a;
- Applying the recognized keywords of the utterance to each candidate title in a list which may be a list of the whole database entries, or a smaller list selected from the database based on a certain criterion;
- As indicated by the loop 351, returning each candidate title's matching information to the processor 105c;
- Computing the score of each candidate title;

Mapping the movie title with highest matching score into a command 361 acceptable by a video server (See FIG. 1, 113 and 114).

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

What invention claimed is:

1. A computer readable storage medium encoded with instructions, which when loaded into a digital computational device establishes a speech-activated Web browsing system, the system comprising:
    a speech recognition system which is designed to recognize an input utterance against a list of candidate textual titles;
    means for extracting textual titles from a given Web page, each of said textual title representing a content item which can be rendered on screen when a command associated with said textual title is activated;
    means for generating a grammar for said textual titles extracted from said Web page, wherein each pathway through the grammar corresponds to a single complete title;
    means for applying said grammar to said speech recognition system;
    wherein said speech recognition system processes the input utterance and determines its confidence level against a pre-set confidence level;
    wherein if the confidence level of the input utterance is higher than said pre-set confidence level, then the textual title corresponding to the input utterance is recognized and the command associated with the textual title corresponding to the input utterance is activated;
    wherein if the confidence level of the input utterance is lower than said pre-set confidence level, then said speech recognition system passes the input utterance through an open vocabulary recognizer, which is designed to transcribe arbitrary statements or texts that do not match any particular grammar path; and
    means for taking an output of said open vocabulary recognizer as an input to an Internet search engine, said Internet search engine returning a Web page containing a number of hits of Internet link options.

2. A method for extending speech-activated Web browsing using a speech control interface, the method comprising the steps of:
    extracting textual titles from a given Web page, each of said textual title representing a content item which can be rendered on screen when a command associated with said textual title is activated;
    generating a grammar for said extracted textual titles, wherein each textual title is associated with a grammar path;
    entering an input utterance to a speech recognition system which is designed to recognize the input utterance against a list of candidate textual titles;
    applying said grammar to said speech recognition system;
    processing the input, utterance and determining its confidence level against a pre-set confidence level;
    if the confidence level the input utterance is higher than said pre-set confidence level, then recognizing the textual title corresponding to the input utterance and activating the command associated with the textual title corresponding to the input utterance;
    if the confidence level of the input utterance is lower than said pre-set confidence level, passing said input utterance through an open vocabulary recognizer, which is designed to transcribe arbitrary statements or texts that do not match any particular grammar path;
    taking an output of said open vocabulary recognizer as an input to an Internet search engine; and
        returning a Web page containing a number of hits of Internet link options.

* * * * *